United States Patent
Thackeray et al.

(10) Patent No.: US 8,383,077 B2
(45) Date of Patent: Feb. 26, 2013

(54) SURFACE STABILIZED ELECTRODES FOR LITHIUM BATTERIES

(75) Inventors: Michael M. Thackeray, Naperville, IL (US); Sun-Ho Kang, Naperville, IL (US); Christopher S. Johnson, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 13/396,338

(22) Filed: Feb. 14, 2012

(65) Prior Publication Data

US 2012/0141860 A1    Jun. 7, 2012

Related U.S. Application Data

(62) Division of application No. 11/809,133, filed on May 30, 2007, now Pat. No. 8,148,011.

(60) Provisional application No. 60/809,478, filed on May 31, 2006.

(51) Int. Cl.
*C01B 13/00* (2006.01)
*H01M 4/00* (2006.01)

(52) U.S. Cl. .................. 423/594.6; 423/579; 423/592.1; 423/594.5; 423/598; 423/604; 423/594.19; 423/594.2; 429/218.1; 429/221; 429/223

(58) Field of Classification Search .................. None
See application file for complete search history.

(56) References Cited

U.S. PATENT DOCUMENTS

| | | | |
|---|---|---|---|
| 5,496,661 A * | 3/1996 | Mao | 429/331 |
| 6,680,143 B2 | 1/2004 | Thackeray et al. | |
| 7,314,682 B2 | 1/2008 | Thackeray et al. | |
| 2006/0188781 A1 | 8/2006 | Thackeray et al. | |
| 2006/0246352 A1 | 11/2006 | Kweon et al. | |

FOREIGN PATENT DOCUMENTS

JP    06243871    9/1994

OTHER PUBLICATIONS

Z. Chen et al., Effect of a ZrO2 Coating on the Structure and Electrochemistry of LixCoO2 When Cycled to 4.5 V, Electrochemical and Solid-State Letters, vol. 5 (10), A213-A216 (2002).
J. Cho et al., Novel LiCoO2 Cathode Material with A12O3 Coating for a Li Ion Cell, Chem. Mater. (2000) vol. 12, 3788-3791.
J. Cho et al., High-Performance ZrO2-Coated LiNiO2 Cathode Material, Electrochemical and Solid State Letters, (2001), vol. 4 (10) A159-A161.
R.J. Gummow et al., Improved Capacity Retention in Rechargeable 4 V Lithium/Lithium-Manganese Oxide (spinel) Cells, Solid State Ionics (1994) 69, 59-67.
G. Amatucci et al., Optimization of Insertion Compounds Such as LiMn2O4 for Li-Ion Batteries, Journal of the Electrochemical Society (2002) 149 (12), K31-K46.
W. Choi et al., Superior Capacity Retention Spinel Oxyfluoride Cathodes for Lithium-Ion Batteries, Electrochemical and Solid State Letters (2006) vol. 9 (5) A245-A248.

(Continued)

*Primary Examiner* — Cynthia Lee
(74) *Attorney, Agent, or Firm* — Olson & Cepuritis, Ltd.

(57) ABSTRACT

A method of stabilizing a metal oxide or lithium-metal-oxide electrode comprises contacting a surface of the electrode, prior to cell assembly, with an aqueous or a non-aqueous acid solution having a pH greater than 4 but less than 7 and containing a stabilizing salt, for a time and at a temperature sufficient to etch the surface of the electrode and introduce stabilizing anions and cations from the salt into said surface. The structure of the bulk of the electrode remains unchanged during the acid treatment. The stabilizing salt comprises fluoride and at least one cationic material selected from the group consisting of ammonium, phosphorus, titanium, silicon, zirconium, aluminum, and boron.

12 Claims, 13 Drawing Sheets

OTHER PUBLICATIONS

J. S. Kim et al., The Electrochemical Stability of Spinel Electrodes Coated With ZrO2, Al2O3, and SiO2 from Colloidal Suspensions, Journal of the Electrochemical Society, (2004) vol. 151 (10) A1755-A1761.

M. M. Thackeray et al., Advances in Manganese-Oxide 'Composite' Electrodes for Lithium-Ion Batteries, Journal of Materials Chemistry (2005) vol. 15 2257-2267.

* cited by examiner

SURFACE STABILIZED ELECTRODES FOR LITHIUM BATTERIES

CROSS REFERENCE TO RELATED APPLICATIONS

This application is a division of application Ser. No. 11/809,133, filed May 30, 2007, which claims the benefit of provisional application Ser. No. 60/809,478 filed May 31, 2006, each of which is incorporated herein by reference in its entirety.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to improved metal-oxide- and lithium-metal-oxide electrodes for lithium cells and batteries, notably rechargeable lithium-ion cells and batteries. These batteries are used to power a wide range of applications such as portable telecommunications equipment, computers, medical devices, electric vehicles and hybrid-electric vehicles. The invention relates preferably to lithium-metal-oxide electrodes with layered- and spinel-type structures that are chemically preconditioned prior to cell assembly or in-situ in an electrochemical cell to improve the capacity, cycling efficiency and stability of lithium cells and batteries when charged to high potentials.

BACKGROUND OF THE INVENTION

State-of-the-art lithium-ion cells have a lithiated carbon negative electrode, or anode, ($Li_xC_6$) and a lithium-cobalt-oxide positive electrode, or cathode, $Li_{1-x}CoO_2$. During charge and discharge of the cells, lithium ions are transported between the two host structures of the anode and cathode with the simultaneous oxidation or reduction of the host electrodes, respectively. When graphite is used as the anode, the voltage of the cell is approximately 4 V. The $LiCoO_2$ cathode, which has a layered structure, is expensive and becomes unstable at low lithium content, i.e., when cells reach an overcharged state at x>0.5. Alternative, less expensive electrode materials that are isostructural with $LiCoO_2$, such as $LiNi_{0.8}Co_{0.2}O_2$, $LiNi_{0.5}Mn_{0.5}O_2$ and $LiMn_{0.33}Ni_{0.33}Co_{0.33}O_2$ are being developed with the hope of replacing at least part of the cobalt component of the electrode. However, these layered structures, when extensively delithiated become unstable, because of the high oxygen activity at the surface of the particles. Therefore, the delithiated electrode particles tend to react with the organic solvents of the electrolyte or lose oxygen. Such reactions at the surface of metal-oxide- and lithium-metal-oxide electrodes, in general, are detrimental to the performance of the lithium cells and batteries, and methods are required to combat these reactions to ensure that maximum capacity and cycle life can be obtained from the cells.

Several efforts have already been made in the past to overcome the stability and solubility problems associated with lithium-metal-oxide electrodes. For example, considerable success has been achieved by stabilizing electrodes by pre-treating the electrode powders with oxide additives such as $Al_2O_3$ or $ZrO_2$ obtained from metal alkoxide precursors such as solutions containing aluminum ethylhexanoate diisopropoxide ($Al(OOC_8H_{15})(OC_3H_7)_2$) or zirconium ethylhexanoisopropoxide ($Zr[(OOC_8H_{15})_2(OCH_3H_7)_2]$) as described, for example, by J. Cho et al in Chemistry of Materials, Volume 12, page 3788 (2000) and J. Cho et al in Electrochemical and Solid State Letters, Volume 4 No. 10, page A159 (2001), respectively, or a zirconium oxide, polymeric precursor or zirconium oxynitrate ($ZrO(NO_3)_2.xH_2O$) as described by Z. Chen et al in Electrochemical and Solid State Letters, Volume 5, No. 10, page A213 (2002), prior to the fabrication of the final electrode thereby making the surface of the $LiCoO_2$ particles more resistant to electrolyte attack, cobalt dissolution or oxygen loss effects.

The loss of oxygen from lithium metal oxide electrodes, such as layered $LiCoO_2$ and $LiNi_{1-y}Co_yO_2$ electrodes can contribute to exothermic reactions with the electrolyte and with the lithiated carbon negative electrode, and subsequently to thermal runaway if the temperature of the cell reaches a critical value. Although some success has been achieved in the past to improve the performance of lithium-ion cells by coating electrode particles, the coatings can themselves impede lithium diffusion in and out of the layered electrode structure during electrochemical discharge and charge. Further improvements in the composition of high potential metal-oxide- and lithium-metal oxide electrodes, particularly at the surface of the electrodes, and in methods to manufacture them are still required to improve the overall performance and safety of lithium cells.

Lithium metal oxides that have a spinel-type structure are alternative electrodes for commercial lithium-ion cells and batteries, notably those used in high-power applications. Of particular significance is the lithium-manganese-oxide spinel, $LiMn_2O_4$, and its cation-substituted derivatives, $LiMn_{2-x}M_xO_4$, in which M is one or more metal ions typically a monovalent or a multivalent cation such as $Li^+$, $Mg^{2+}$ and $Al^{3+}$, as reported by Gummow et al. in U.S. Pat. No. 5,316,877 and in Solid State Ionics, Volume 69, page 59 (1994). It is well known that $LiMn_2O_4$ and $LiMn_{2-x}M_xO_4$ spinel electrodes are chemically unstable in a lithium-ion cell environment, particularly at high potentials and/or when the cell operating temperature is raised above room temperature, when manganese ions from the spinel electrodes tend to dissolve in the electrolyte. This process is believed to contribute to the capacity loss of the cells at elevated temperatures. Moreover, the removal of all the lithium from $LiMn_2O_4$ and $LiMn_{2-x}M_xO_4$ electrodes yields a $MnO_2$ component, which itself is a strong oxidizing agent. The surface of such delithiated spinel electrodes can have a high oxygen activity, thereby possibly inducing unwanted oxidation reactions with the electrolyte. Although considerable progress has been made to suppress the solubility and high-temperature performance of spinel electrodes and to improve their stability by cation doping, as described for example by Gummow et al. in U.S. Pat. No. 5,316,877, or by forming oxyfluoride compounds as described by Amatucci et al. in the Journal of the Electrochemical Society, Volume 149, page K31 (2002) and by Choi et al. in Electrochemical and Solid-State Letters, Volume 9, page A245-A248 (2006), or by surface coatings as described by Kim et al. in the Journal of the Electrochemical Society, Volume 151, page A1755 (2004), these treatments have not yet entirely overcome the cycling instability of cells containing manganese-based spinel electrodes.

Furthermore, other metal-oxide- and lithium-metal-oxide electrode materials that are good oxidants are of interest for lithium batteries are known, for example, $V_2O_5$, and materials containing a $V_2O_5$ component, such as $LiV_3O_8$ and $AgV_3O_8$, that can be written alternatively in two-component notation as $Li_2O.3V_2O_5$ and $Ag_2O.V_2O_5$, respectively, and $Ag_2V_4O_{11}$ that can be written alternatively in two-component notation as $Ag_2O.2V_2O_5$. The silver-containing materials, notably $Ag_2V_4O_{11}$, are of particular interest for primary lithium cells in medical devices such as cardiac defibrillators. In this case, a preconditioned electrode with a stable surface layer will help prolong the life of the cell, particularly if left standing in the charged state or partially charged state for long periods of time. The invention extends to include $MnO_2$ and $MnO_2$-containing compounds which, like $V_2O_5$, are strong oxidants, such as $Li_2O.xMnO_2$ and $Ag_2O.xMnO_2$ (x>0) electrode compounds.

It is clear from the prior art that further advances are required, in general, to improve the surface stability of metal-oxide and lithium-metal-oxide electrodes for non-aqueous lithium cells and batteries. This invention relates to such improvements, notably those that are achieved from stabilized electrode surfaces that are engineered by preconditioning electrode particles with aqueous or, preferably, non-aqueous solutions in which the dissolved salts contain both stabilizing cations and anions. The invention relates more specifically to uncycled, preconditioned metal oxide- or lithium metal oxide electrodes, the electrodes being preconditioned in an aqueous or a non-aqueous solution containing stabilizing cations and anions, such that the stabilizing ions are etched into the electrode surface to form a protective layer. Methods of preconditioning the electrodes are disclosed as are electrochemical cells and batteries containing the electrodes.

SUMMARY OF THE INVENTION

This invention relates, in general, to improved metal-oxide and lithium-metal-oxide electrodes, including cathodes and/or anodes for lithium cells and batteries, preferably rechargeable lithium-ion cells and batteries. More specifically, the invention relates to metal-oxide and lithium-metal-oxide electrodes that are chemically preconditioned prior to cell fabrication and assembly or in-situ in an electrochemical cell by treating the electrode particles with an aqueous or a non-aqueous solution containing dissolved salts of both stabilizing cations and anions. The invention relates more specifically to electrode particles with surfaces that are simultaneously etched and protected by the solutions, preferably, but not necessarily, mildly acidic solutions containing stabilizing ammonium, phosphorus, titanium, silicon, zirconium, aluminum and boron cations and fluoride anions, such as those found in $NH_4PF_6$, $(NH_4)_2TiF_6$, $(NH_4)_2SiF_6$, $(NH_4)_2ZrF_6$, $(NH_4)_3AlF_6$, $NH_4BF_4$ or derivatives thereof, optionally in the presence of lithium ions to form a protective surface layer on the electrode particles, thereby improving the capacity, cycling efficiency and cycling stability of lithium cells and batteries when charged to high potentials. The invention relates, in particular, to high potential metal oxide- and lithium-metal oxide electrodes that in the charged state are strong oxidants, for example, those selected from the family of charged layered electrodes, $Li_{1-x}MO_2$, and those derived from lithium-rich $Li_{1+z}M_{1-z}O_2$ compounds. Such lithium $Li_{1+z}M_{1-z}O_2$ compounds can also be represented in two-component notation as $xLi_2M'O_3.(1-x)LiMO_2$ ($0 \leq x < 1$) in which M' is one or more metal ions with an average tetravalent oxidation state and in which M is one or more metal ions with an average trivalent oxidation state. It stands to reason that the invention will also apply to other high-potential metal oxide and lithium-metal oxide electrodes such as spinel lithium-metal-oxides, $LiM_2O_4$, in which M is one or more metal cations with an average oxidation state of 3.5. The spinel electrodes are selected preferably from the subset of substituted spinel lithium-manganese-oxides $LiMn_{2-y}M_yO_4$, and two-component 'layered-spinel' $xLi_2M'O_3.(1-x)LiM_2O_4$ ($0 \leq x < 1$) composite electrodes in which M' is one or more metal ions with an average tetravalent oxidation state, as described above. The invention also applies to the family of $V_2O_5$-containing compounds, such as $V_2O_5$ itself, and lithium- and silver-derivative compounds such as $LiV_3O_8$ ($Li_2O.3V_2O_5$) and $Ag_2V_4O_{11}$ ($Ag_2O.2V_2O_5$) and to $MnO_2$, and $MnO_2$-containing compounds, such as $Li_2O.xMnO_2$ and $Ag_2O.xMnO_2$ (x>0) electrode compounds. The invention extends to methods for synthesizing the preconditioned metal-oxide and lithium-metal-oxide electrodes.

The principles of the invention are demonstrated with respect to the following samples:

Sample A: untreated $0.1Li_2MnO_3.0.9LiCo_{0.372}Ni_{0.372}Mn_{0.256}O_2$

Sample B: Sample A treated with 0.86 wt % $NH_4F$ in methanol

Sample C: Sample A treated with 0.66 wt % $NH_4PF_6$ in methanol

Sample D: Sample A treated with 0.76 wt % $(NH_4)_3AlF_6$ in water

Sample E: Sample A treated with 1 wt % $H_3PO_4$+0.66 wt % $NH_4PF_6$ in methanol Sample F: Sample A treated with 0.61 wt % $NH_4BF_4$ in methanol The molarity of the fluorinated salt solutions was approximately $2.5 \times 10^{-3}$ M in all cases.

BRIEF DESCRIPTION OF THE DRAWINGS

The invention consists of certain novel features hereinafter fully described, and illustrated in the accompanying drawings, it being understood that various changes in the details may be made without departing from the spirit, or sacrificing any of the advantages of the present invention.

FIG. 1 illustrates the powder X-ray diffraction patterns of:

a) an untreated $0.1Li_2MnO_3.0.9LiCo_{0.372}Ni_{0.372}Mn_{0.256}O_2$ electrode (Sample A);

b) a $0.1Li_2MnO_3.0.9LiCo_{0.372}Ni_{0.372}Mn_{0.256}O_2$ electrode treated with a $2.5 \times 10^{-3}$ M solution of $NH_4PF_6$ in methanol and dried at 600° C. in air (Sample C);

c) a $0.1Li_2MnO_3.0.9LiCo_{0.372}Ni_{0.372}Mn_{0.256}O_2$ electrode treated with a $2.5 \times 10^{-3}$ M solution of $(NH_4)_3AlF_6$ in water and dried at 600° C. in air (Sample D).

Figure 2:
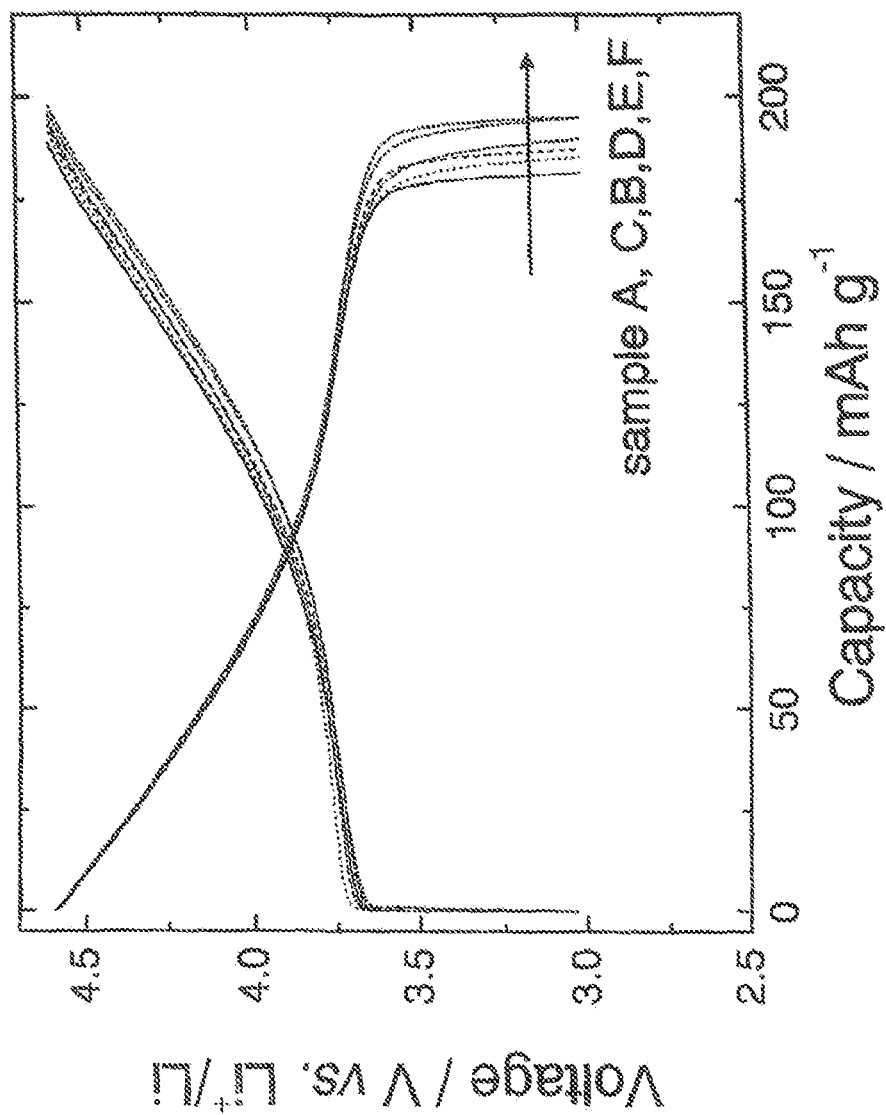
Figure 3:
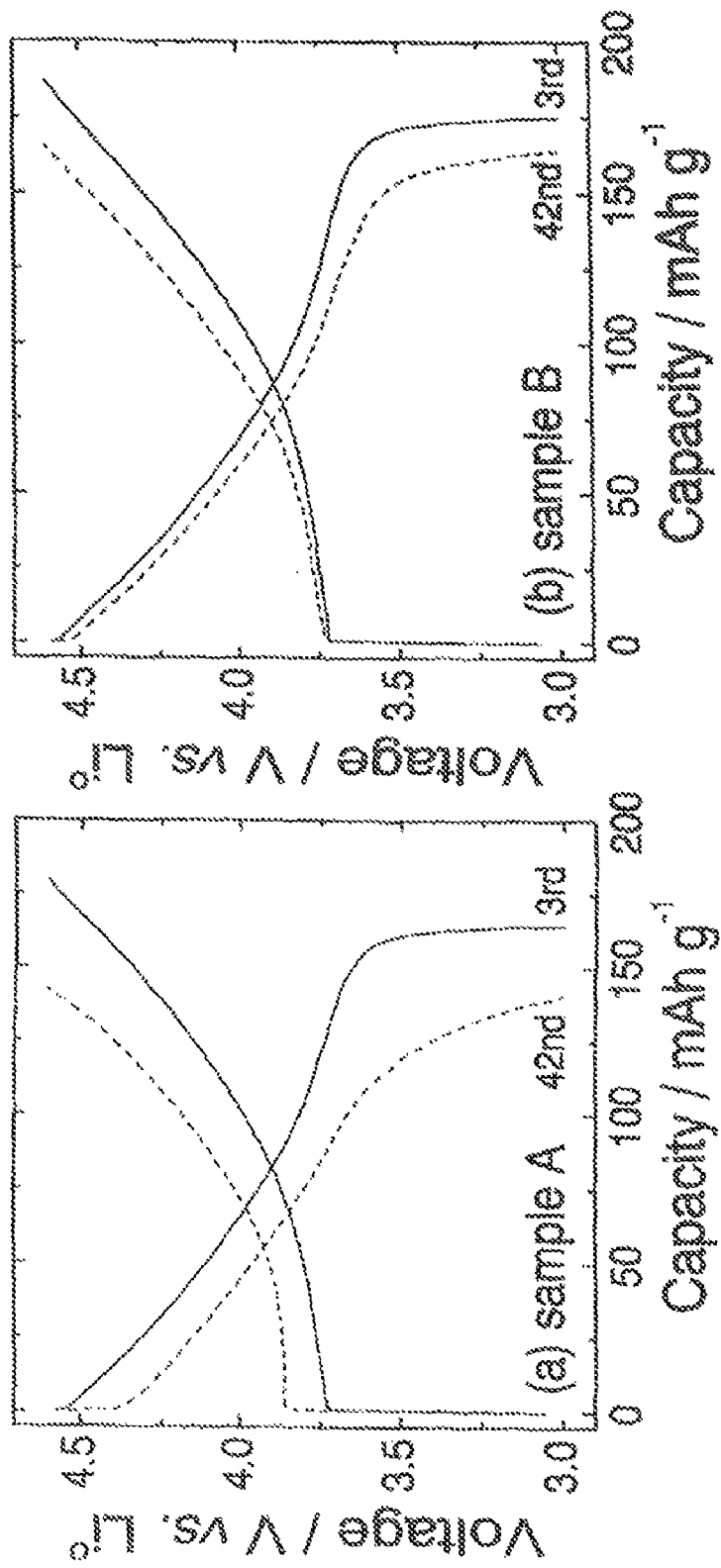
Figure 3:
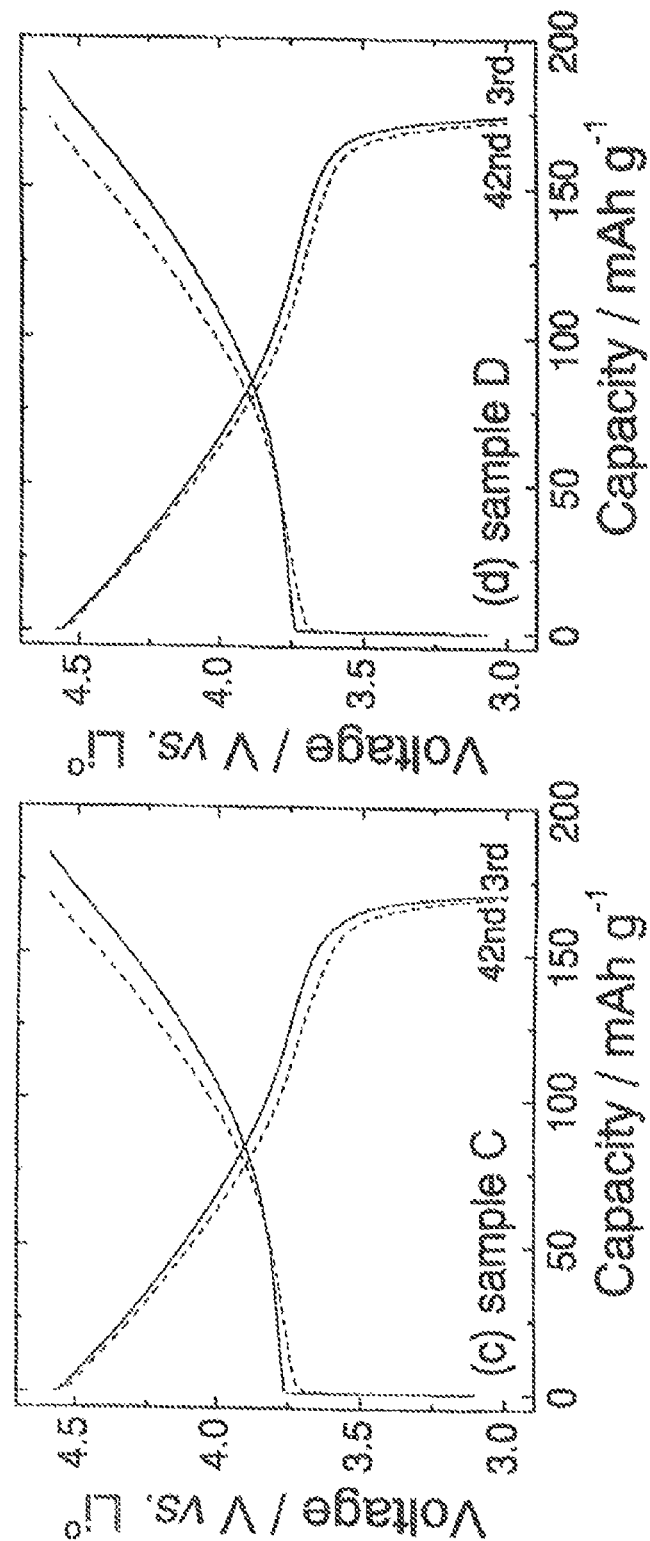
Figure 3:
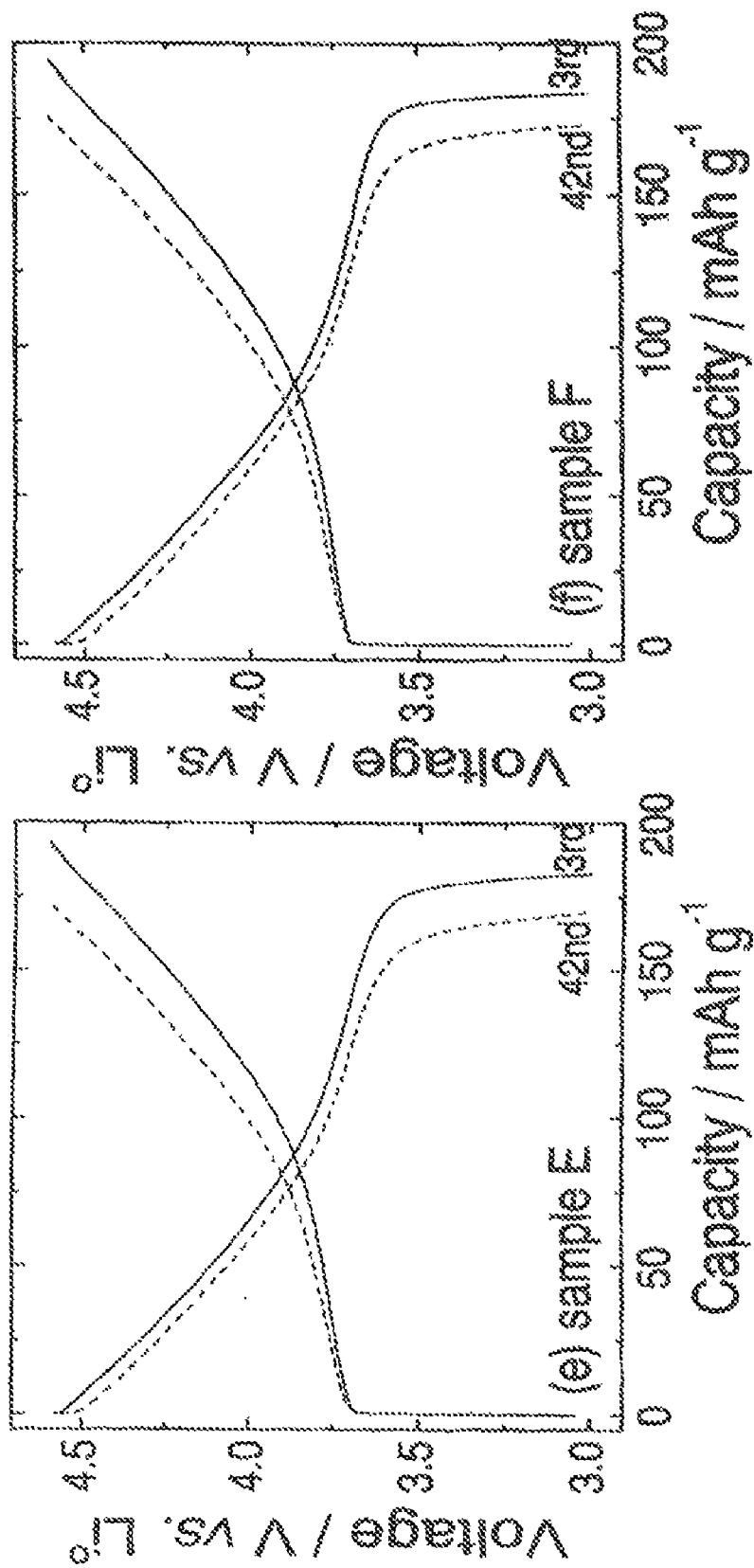

FIG. 2 illustrates the charge and discharge voltage profiles of lithium half cells after the initial charge/discharge cycle, containing electrode samples A to F between 3.0 and 4.6 V at 0.1 mA/cm² at room temperature, FIG. 3(a-f) illustrates the charge and discharge voltage profiles of the $3^{rd}$ and $42^{nd}$ cycles of lithium half cells containing electrode samples A to F between 3.0 and 4.6 V at 0.5 mA/cm² at room temperature.

Figure 4:
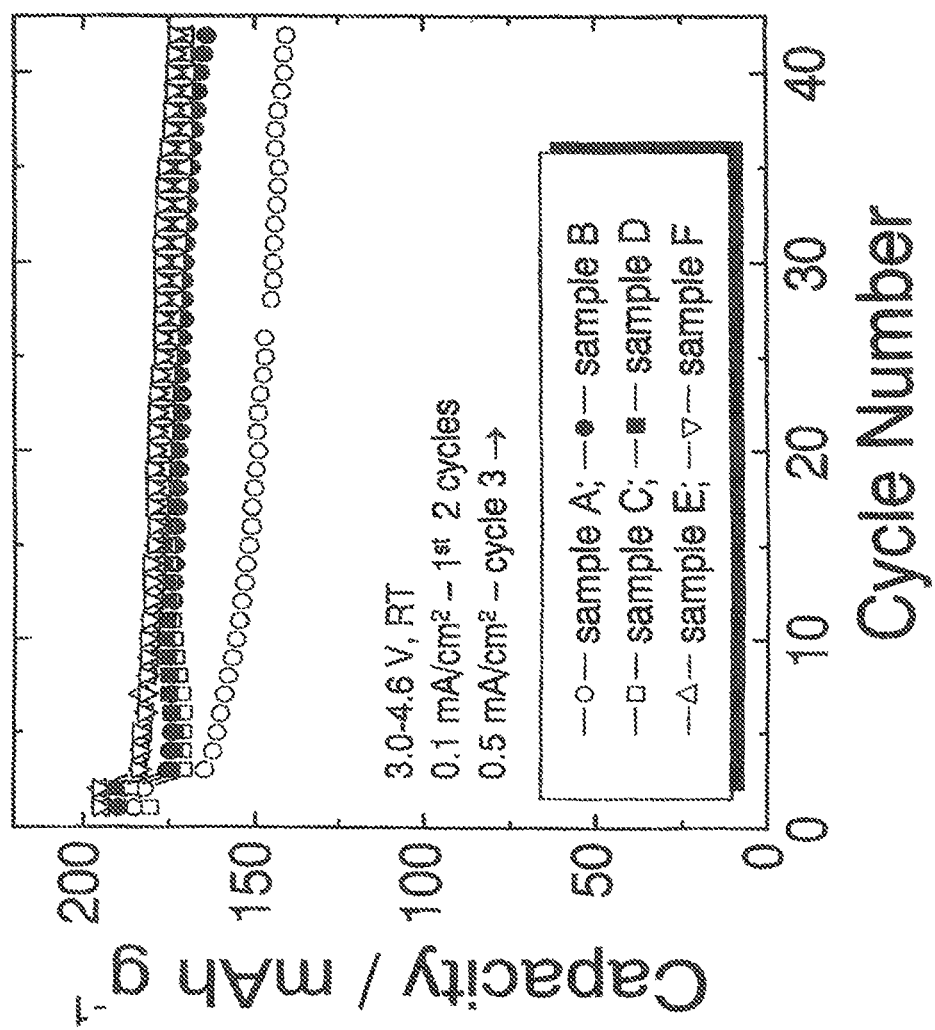

FIG. 4 illustrates the capacity vs. cycle number of lithium half cells containing electrode samples A-F, between 3.0 and 4.6 V for the first 42 cycles at room temperature.

Figure 5:
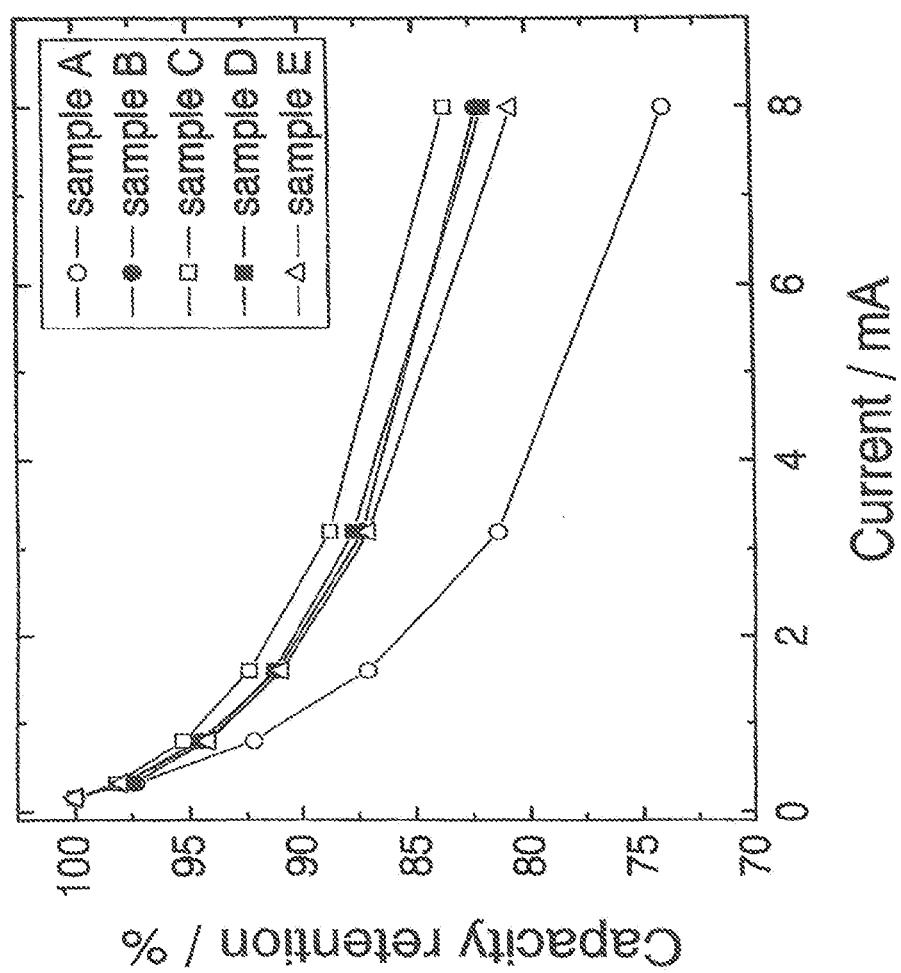

FIG. 5 illustrates the capacity of lithium half cells containing electrode samples A-E delivered between 4.6 and 3.0 V at current rates between 0.16 and 8 mA at room temperature.

Figure 6:
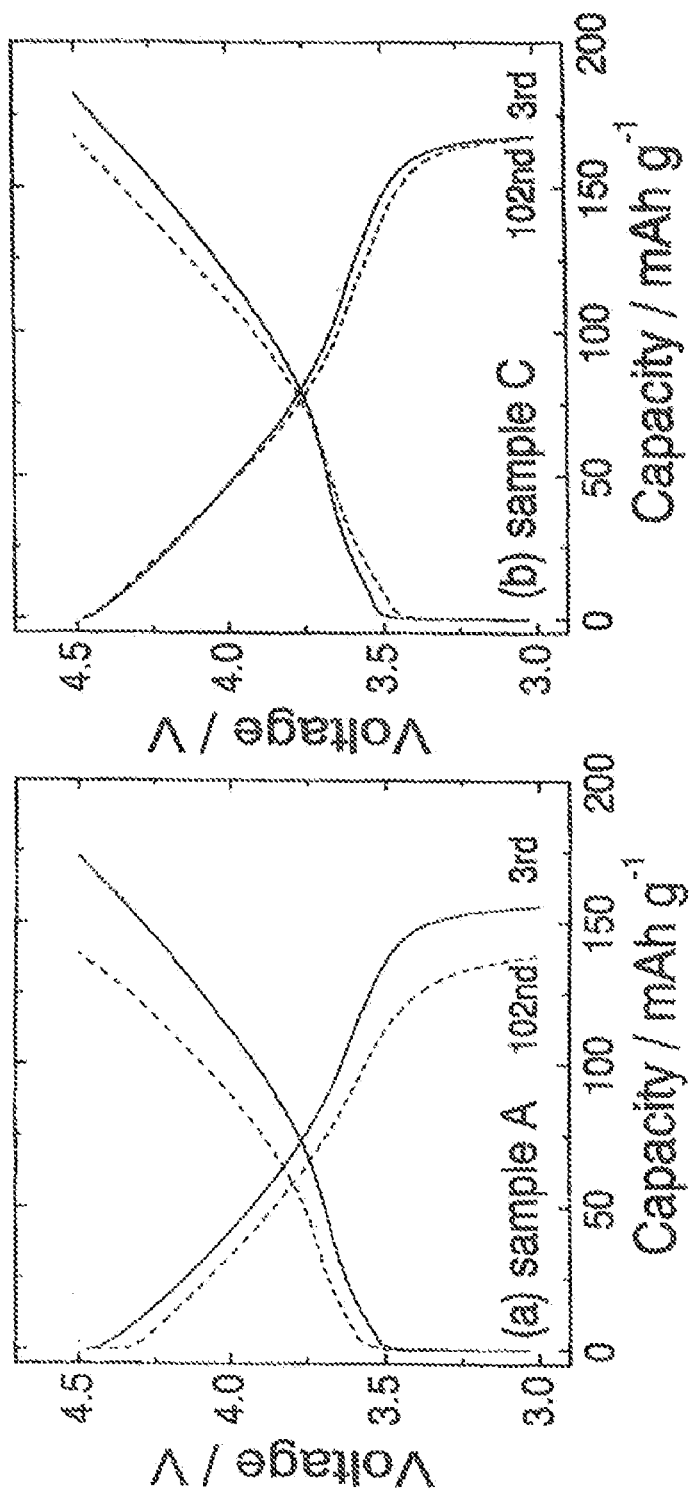
Figure 6:
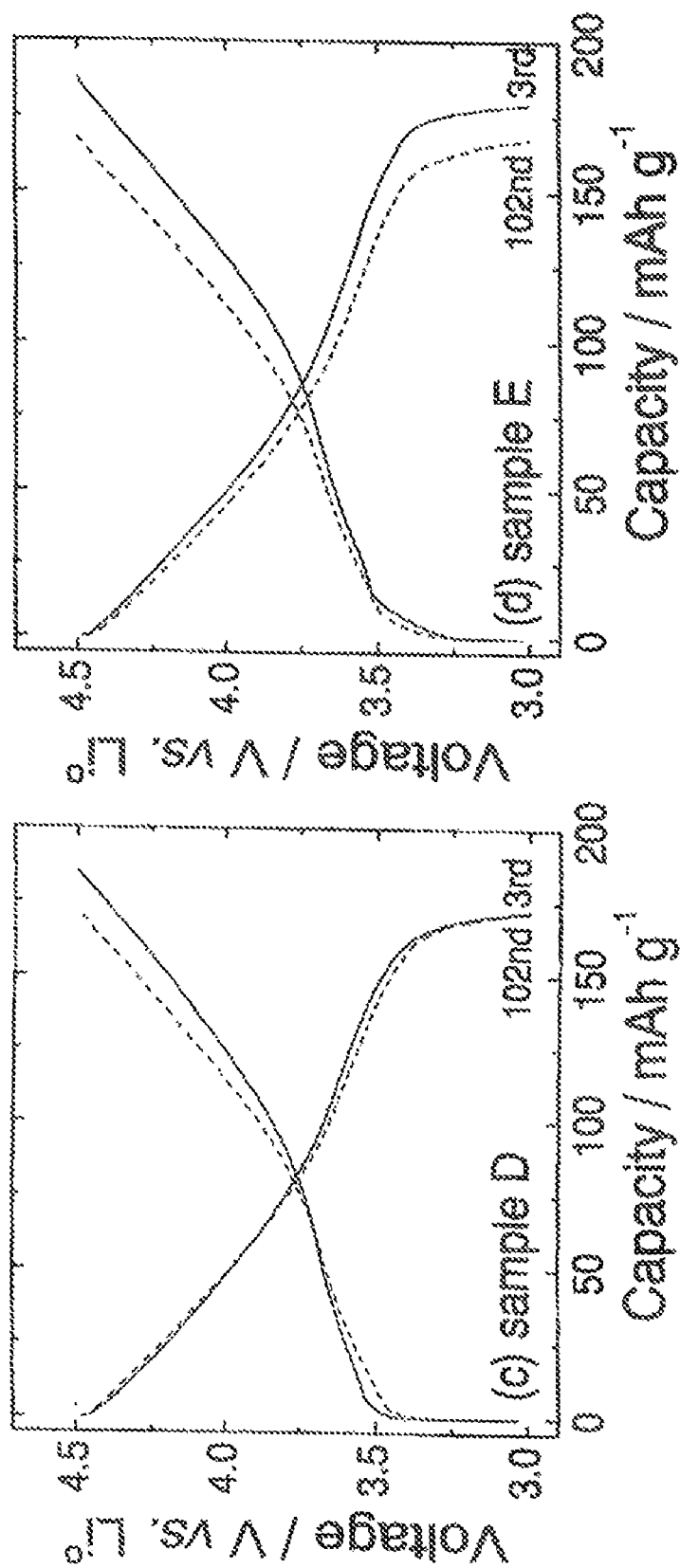
Figure 6:
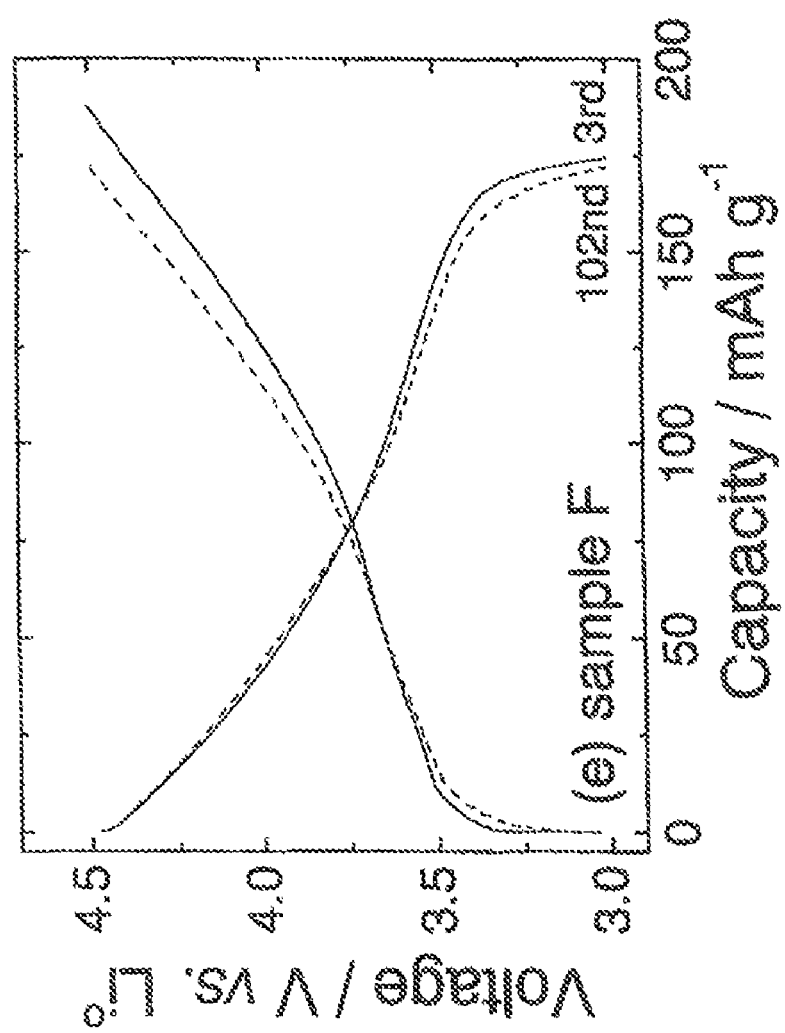

FIG. 6(a-e) illustrates the charge and discharge voltage profiles of the $3^{rd}$ and $102^{nd}$ cycles of lithium-ion (full) cells containing electrode samples A, C, D, E and F between 3.0 and 4.6 V at 0.5 mA/cm² at room temperature.

Figure 7:
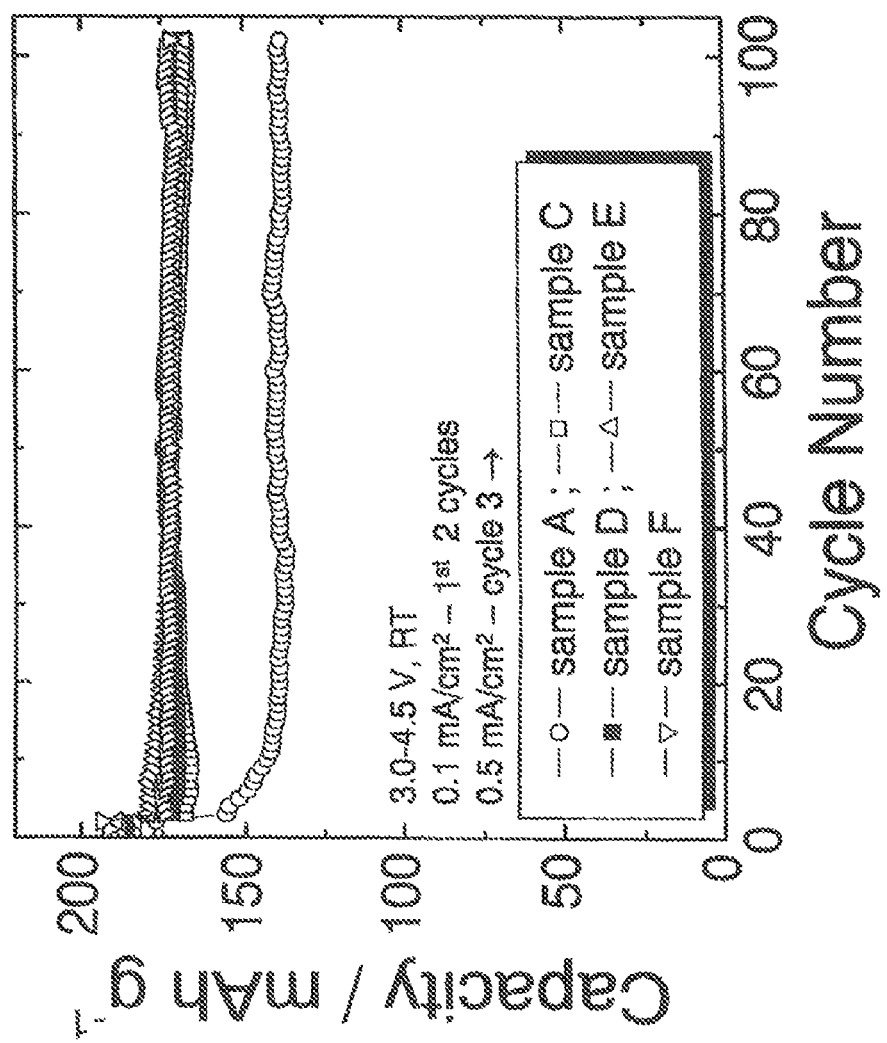

FIG. 7 illustrates the capacity vs. cycle number of lithium half cells containing electrode samples A, C, D, E and F, between 3.0 and 4.6 V for the first 100 cycles at room temperature.

Figure 8:
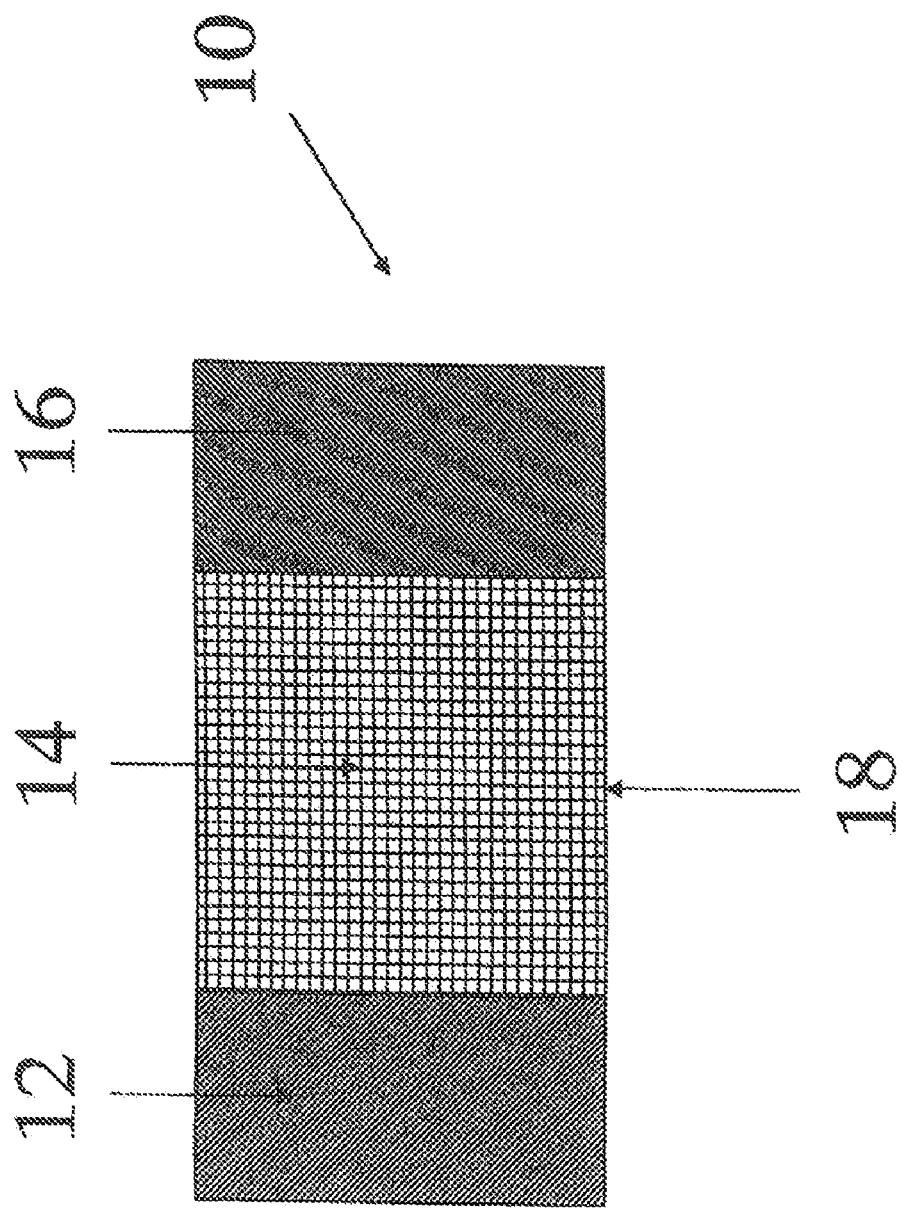

FIG. 8 illustrates a schematic representation of an electrochemical cell; and

Figure 9:
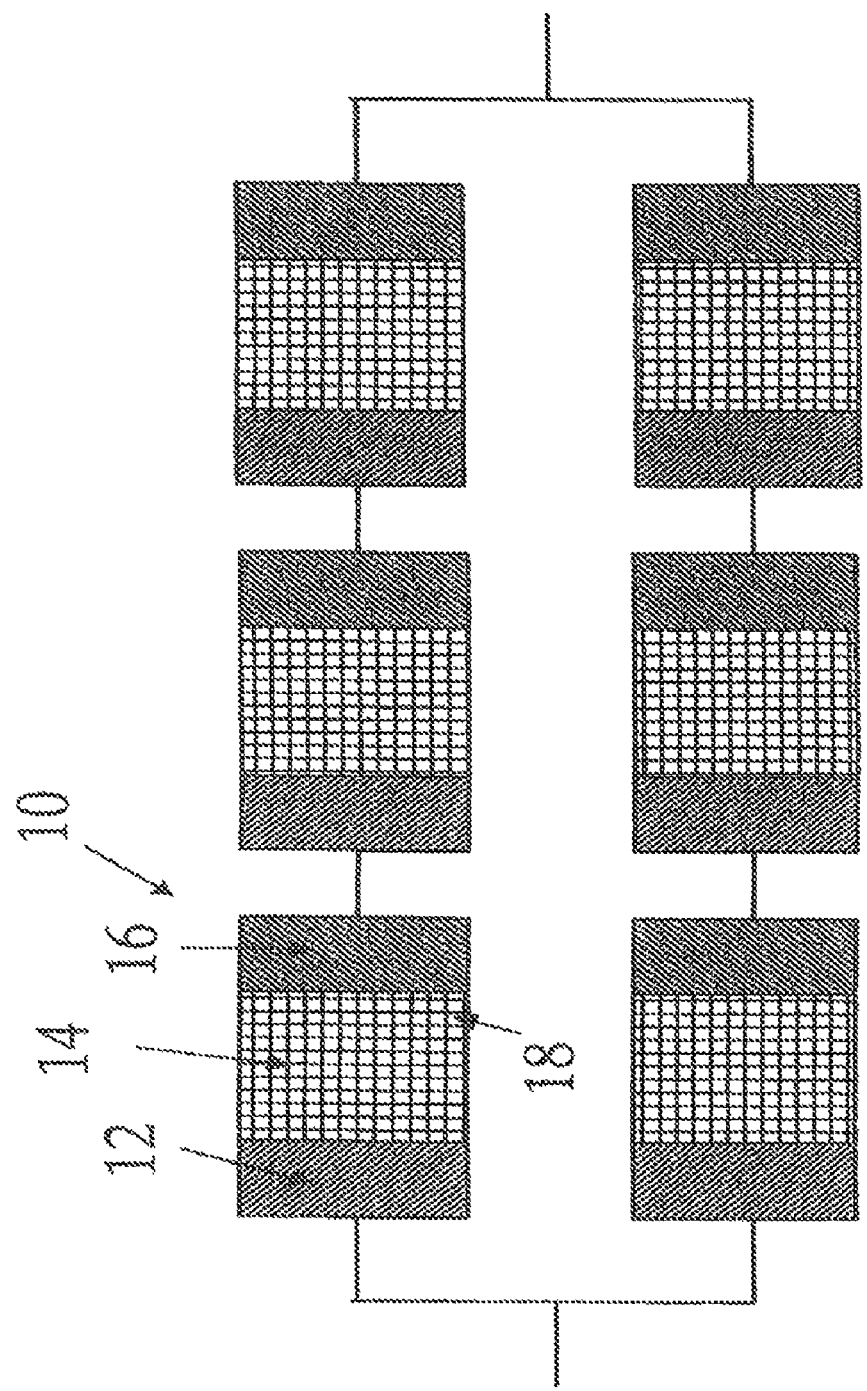

FIG. 9 illustrates a schematic representation of a battery consisting of a plurality of cells connected electrically in series and in parallel.

DETAILED DESCRIPTION OF PREFERRED EMBODIMENTS

Metal oxide- or lithium-metal-oxide electrodes that provide a high electrochemical potential, typically above 3 V, against lithium metal, such as oxides containing the first-row transition metal ions, $V^{5+}$, $Mn^{4+}$, $Co^{4+}$ and $Ni^{4+}$ ions tend to be strong oxidizing agents and therefore can react with the non-aqueous electrolytes of lithium cells, particularly at the surfaces of electrode particles. For example, highly delithiated layered $Li_{1-x}MO_2$ and spinel $Li_{1-x}Mn_{2-y}M_yO_4$ electrodes can react spontaneously with the organic-based electrolyte solvents such as ethylene carbonate, diethyl carbonate or dimethyl carbonate; in extreme cases, the electrodes can release oxygen into the cell compartment that may cause possible thermal runaway, venting or explosion, sometimes with fire. Even without the catastrophic failure described above, the release of oxygen from the electrode lowers the average oxidation state of the electrochemically active transition metal ions, particularly at the electrode surface, which can increase cell impedance, and reduce the capacity and long term cycling stability of the cells. It is therefore important to find effective methods to reduce the high activity of charged metal-oxide- and lithium-metal-oxide electrode surfaces without compromising the energy and power of the cells, while at the same time enhancing safety.

This invention relates, in general, to uncycled preconditioned metal-oxide- or lithium-metal-oxide electrodes, including cathodes and/or anodes for non-aqueous lithium electrochemical cells and batteries, the electrodes being preconditioned in an aqueous or, preferably, a non-aqueous solution containing stabilizing cations and anions, such as phosphorus, titanium, silicon, zirconium and aluminum cations and fluoride anions, that are chemically etched into the surface of the electrodes to form a protective layer in order to improve the electrochemical properties of said cells and batteries and to methods of making same. The invention relates, more specifically, to electrodes that are preconditioned prior to cell assembly or in-situ in an electrochemical cell to improve the capacity, cycling efficiency and cycling stability of lithium cells and batteries when charged to high potentials. The invention relates, in particular, to metal oxide- and lithium-metal oxide electrode materials that in their unconditioned, charged state are strong oxidants.

In a first embodiment, the invention relates to preconditioned lithium-metal oxide electrodes selected from the family of layered compounds, $LiMO_2$, including lithium-rich materials, $Li_{1+z}M_{1-z}O_2$, that can be represented, alternatively, in two-component notation as $xLi_2M'O_3 \cdot (1-x)LiMO_2$ ($0 \leq x < 1$) in which M' is one or more metal ions with an average tetravalent oxidation state, selected preferably from Mn, Ti, and Zr, and in which M is one or more metal ions with an average trivalent oxidation state, and M is selected preferably from Mg, Al, Ti, V, Cr, Mn, Fe, Co, and Ni.

In a second embodiment, the invention relates to preconditioned lithium-metal oxide electrodes selected from the family of spinel lithium-metal-oxides, $LiM_2O_4$, in which M is one or more metal cations, selected preferably from the subset of substituted spinel lithium-manganese-oxides $LiMn_{2-y}M_yO_4$, in which M is one or more metal ions selected preferably from Li, Mg, Al, Ti, V, Cr, Mn, Fe, Co, Ni, Cu and Zn, and two-component $xLi_2M'O_3 \cdot (1-x)LiM_2O_4$ ($0 \leq x < 1$) composite electrodes in which M' is one or more metal ions selected preferably from Mn, Ti, and Zr. The relative amounts of M' and M cations are selected such that there is charge balance in the electrode. The $xLi_2M'O_3 \cdot (1-x)LiMO_2$ and $xLi_2M'O_3 \cdot (1-x)LiM_2O_4$ ($0 \leq x < 1$) composite electrodes have complex and disordered structures, as described in detail by Thackeray et al. in J. Materials Chemistry, Volume 15, page 2257, (2005) and references cited therein.

In a third embodiment, the invention relates to preconditioned metal-oxide- or lithium-metal-oxide electrodes from the family of $V_2O_5$-containing and $MnO_2$-containing compounds, such as $V_2O_5$ and $MnO_2$ themselves, and lithium and silver derivatives thereof, such as $LiV_3O_8$ ($Li_2O \cdot 3V_2O_5$), $Ag_2V_4O_{11}$ ($Ag_2O \cdot 2V_2O_5$), $Li_2O \cdot xMnO_2$ and $Ag_2O \cdot xMnO_2$ (x>0) compounds.

In a fourth embodiment, the invention relates to methods for fabricating the preconditioned metal-oxide- and lithium-metal-oxide electrodes by treating the metal-oxide- and lithium-metal-oxide electrode particles prior to cell fabrication and assembly with either an aqueous or a non-aqueous solution containing dissolved salts containing stabilizing cations and anions. In a preferred embodiment, the solutions are mildly acidic, for example, with a pH between 4 and 7, preferably between 5 and 7, and most preferably between 6 and 7. Because water reacts readily with lithium at the negative electrode and can result in undesirable $H^+$—$Li^+$ ion-exchange reactions at lithium-metal-oxide electrodes, it is preferable to precondition the electrodes in non-aqueous solutions, such as alcohols, for example, methanol, ethanol and the like. Combinations of aqueous and non-aqueous solvents for dissolving the salts can be used, for example, methanol and water. If aqueous solutions are used, then it stands to reason that the electrodes must be sufficiently heated and dried to reduce the water content as much as possible without damaging the electrochemical properties of the electrode. The invention relates more specifically to preconditioned metal-oxide- and lithium-metal-oxide electrode particles with surfaces etched by solutions, preferably mildly acidic solutions with 4<pH<7, more preferably 5<pH<7, and most preferably 6<pH<7, the solutions containing stabilizing ammonium, phosphorus, titanium, silicon, zirconium, aluminum and boron cations and fluoride anions, such as those found in $NH_4PF_6$, $(NH_4)_2TiF_6$, $(NH_4)_2SiF_6$, $(NH_4)_2ZrF_6$, $(NH_4)_3AlF_6$, $NH_4BF_4$ salts or derivatives thereof, to improve the capacity, cycling efficiency and cycling stability of lithium cells and batteries when charged to high potentials. These preconditioning reactions can take place optionally in the presence of lithium ions.

The following examples describe the principles of the invention and possible methods for synthesizing the pre-reduced electrodes of this invention as contemplated by the inventors, but they are not to be construed as limiting examples.

EXAMPLES

Synthesis of $0.1Li_2MnO_3 \cdot 0.9LiCo_{0.372}Ni_{0.372}Mn_{0.256}O_2$ and Preconditioned $0.1Li_2MnO_3 \cdot 0.9LiCo_{0.372}Ni_{0.372}Mn_{0.236}O_2$ Electrode Materials Electrode materials with the formula $0.1Li_2MnO_3 \cdot 0.9LiCo_{0.372}Ni_{0.372}Mn_{0.256}O_2$ are prepared typically as follows. First, a $Mn_{0.33}Ni_{0.33}Co_{0.33}(OH)_x$ precursor is prepared by coprecipitation of the required stiochiometric amounts of metal nitrates $M(NO_3)_2 \cdot xH_2O$ (M=Mn, Ni, and Co). $Li_2CO_3$ is then intimately mixed with the $(Mn_{0.330}Ni_{0.335}Co_{0.335})(OH)_x$ (x~2) precursor in a ratio of $Li_2CO_3$:$(Mn_{0.330}Ni_{0.335}Co_{0.335})(OH)_x$=0.55:1 (or Li:(Mn+Ni+Co) =1.1:1). The powder mixture is calcined at 700° C. for 16 hours in air and then at 950° C. for 12 hours in air to make $0.1Li_2MnO_3 \cdot 0.9LiCo_{0.372}Ni_{0.372}Mn_{0.256}O_2$.

For the experiments of this invention, parent $0.1Li_2MnO_3 \cdot 0.9LiCo_{0.372}Ni_{0.372}Mn_{0.256}O_2$ electrode samples, referred to as Sample A, were preconditioned prior to cell assembly with various mild acids. For example, Sample A was treated with a $2.5 \times 10^{-3}$M $NH_4F$ solution in laboratory grade methanol containing trace amounts of water (typically up to 0.1%), the pH of which was approximately 6.5. The sample was stirred in the solution at room temperature for 12 h and then dried (still under stirring) at ~50° C., prior to heating at 600° C. in air for 6 hours (Sample B).

In a second example, Sample A was treated with a $2.5 \times 10^{-3}$ M $NH_4PF_6$ solution in laboratory grade methanol containing trace amounts of water (typically up to 0.1%), the pH of which was approximately 6.5. The sample was stirred in the solution at room temperature for 12 h and then dried (still under stirring) at ~50° C., prior to heating at 600° C. in air for 6 hours (Sample C).

In a third example, Sample A was treated with a $2.5 \times 10^{-3}$M $(NH_4)_3AlF_6$ solution in water, the pH of which was approximately 6.5. The sample was stirred in the solution at room temperature for 12 h and then dried (still under stirring) at ~50° C., prior to heating at 600° C. in air for 6 hours (Sample D).

In a fourth example, Sample A was treated with 1 wt % $H_3PO_4$ aqueous solution together with a $2.5 \times 10^{-3}$M $NH_4PF_6$ solution in laboratory grade methanol containing trace amounts of water (typically up to 0.1%), the pH of which was approximately 6.5. The sample was stirred in the solution at room temperature for 12 h and then dried (still under stirring) at ~50° C., prior to heating at 600° C. in air for 6 hours (Sample E).

In a fifth example, Sample A was treated with a $2.5 \times 10^{-3}$M $NH_4BF_4$ solution in laboratory grade methanol containing trace amounts of water (typically up to 0.1%), the pH of which was approximately 6.5. The sample was stirred in the solution at room temperature for 12 h and then dried (still under stirring) at ~50° C., prior to heating at 600° C. in air for 6 hours (Sample F).

Figure 1:
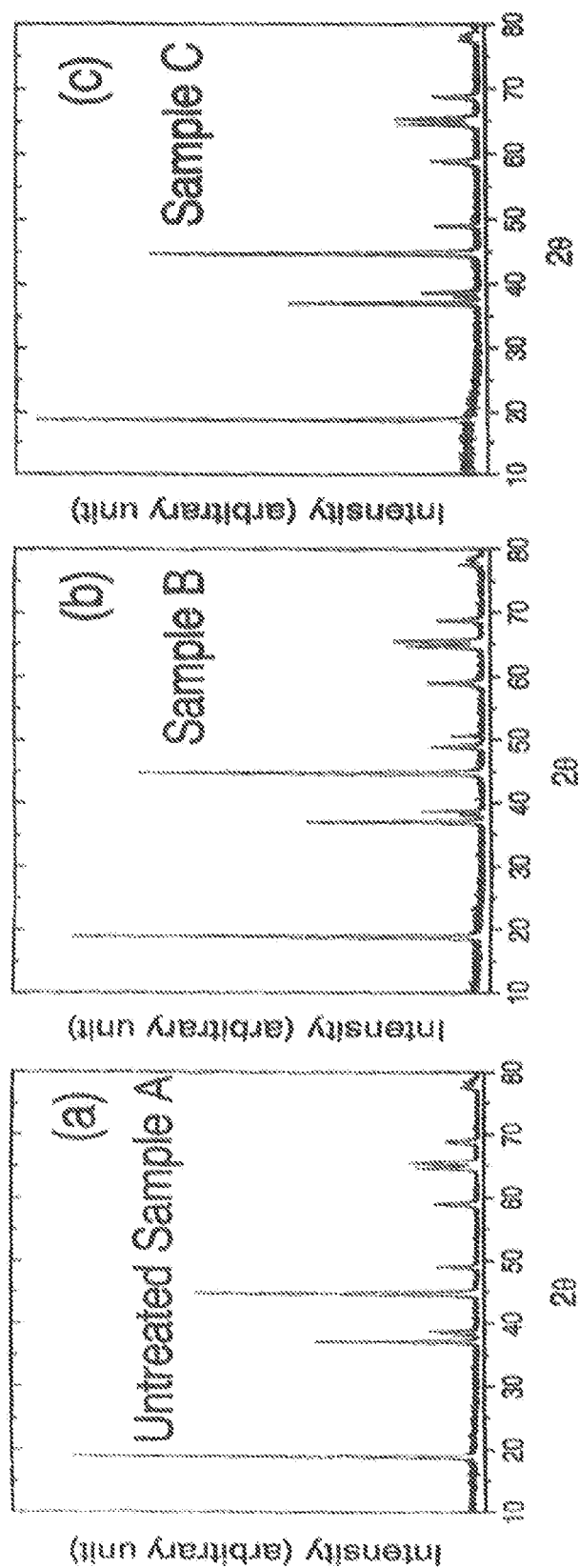

The X-ray diffraction patterns of Samples A, C and D are shown, by way of example, in FIG. 1(a-c). There were no significant differences in the X-ray patterns of Samples A, C and D, indicating that no significant changes had occurred to the bulk structure of the individual compounds during the preconditioning reactions. The X-ray diffraction patterns of Samples B, E and F were essentially identical to those of Samples A, C and D.

Electrochemical Evaluation of $0.1Li_2MnO_3 \cdot 0.9LiCo_{0.372}Ni_{0.372}Mn_{0.256}O_2$ Electrodes and Preconditioned $0.1Li_2MnO_3 \cdot 0.9LiCo_{0.372}Ni_{0.372}Mn_{0.256}O_2$ Electrodes Electrochemical evaluations of $0.1Li_2MnO_3 \cdot 0.9LiCo_{0.372}Ni_{0.372}Mn_{0.256}O_2$ electrodes and preconditioned $0.1Li_2MnO_3 \cdot 0.9LiCo_{0.372}Ni_{0.372}Mn_{0.256}O_2$ positive electrodes were carried out as follows. The electrodes for the lithium cells were fabricated from an intimate mixture of 84 wt % of $0.1Li_2MnO_3 \cdot 0.9LiCo_{0.372}Ni_{0.372}Mn_{0.256}O_2$ electrode powder (or preconditioned $0.1Li_2MnO_3 \cdot 0.9LiCo_{0.372}Ni_{0.372}Mn_{0.256}O_2$ electrode powder), 8 wt % polyvinylidene difluoride (PVDF) polymer binder (Kynar, Elf-Atochem), 4 wt % acetylene black (Cabot), and 4 wt % graphite (SFG-6, Timcal) slurried in 1-methyl-2-pyrrolidinone (NMP) (Aldrich, 99+%). An electrode laminate was cast from the slurry onto an Al current collector foil using a doctor-blade. The laminate was subsequently dried, first at 75° C. for 10 h, and thereafter under vacuum at 70° C. for 12 h. The electrolyte was 1 M $LiPF_6$ in ethylene carbonate (EC):ethylmethyl carbonate (EMC) (3:7 mixture). The electrodes were evaluated at room temperature in lithium half cells (coin-type, size CR2032, Hohsen) with a lithium foil counter electrode (FMC Corporation, Lithium Division) and a polypropylene separator (Celgard 2400). They were also evaluated at room temperature in full, lithium-ion-type coin cells against a MCMB 1028 graphite electrode. Cells were assembled inside an argon-filled glovebox (<5 ppm, $H_2O$ and $O_2$) and cycled on a Maccor Series 2000 tester under galvanostatic mode using a constant current density initially of 0.1 mA/cm² for the first two cycles and, thereafter, at a higher current rate of 0.5 mA/cm². Lithium half cells were cycled between 4.6 and 3.0 V, whereas lithium-ion full cells were cycled between 4.5 and 3.0 V.

The charge/discharge voltage profiles of lithium half cells after the initial charge/discharge cycle containing an untreated $0.1Li_2MnO_3 \cdot 0.9LiCo_{0.372}Ni_{0.372}Mn_{0.256}O_2$ electrode (Sample A) and $0.1Li_2MnO_3 \cdot 0.9LiCo_{0.372}Ni_{0.372}Mn_{0.256}O_2$ electrodes that had been preconditioned with mildly acidic solutions containing various stabilizing cations and stabilizing fluorine anions (Samples B-F) are shown in FIG. 2(a-f), respectively. The figure demonstrates unequivocally that the initial discharge capacities of the preconditioned electrodes (Samples B to E) are superior to that of the parent, unconditioned electrode (Sample A).

The charge and discharge voltage profiles of the $3^{rd}$ and $42^{nd}$ cycles of lithium half cells containing electrode samples A to F between 4.6 and 3.0 V at 0.5 mA/cm² at room temperature are shown in FIG. 3(a-f), respectively. It is clear from these data that the preconditioned electrodes (Samples B to F) provide enhanced capacity compared to the parent, untreated electrode (Sample A).

The cycling stability of untreated electrode (Sample A) and preconditioned electrodes (Samples B-F) in lithium half cells are compared graphically in capacity vs. cycle number plots in FIG. 4. It is clearly evident from the data that the preconditioned electrodes provide significantly superior capacity and cycling stability to the parent, untreated electrode. The data also show that slightly superior cycling stability is achieved from samples C, D, E and F that had been preconditioned with solutions containing stabilizing P, Al, and B cations as well as $NH^4$ cations and stabilizing F anions, compared to Sample B that had been preconditioned with $NH_4F$. In this respect, it is noted that any basic ammonium- or residual nitrogen-containing species will likely remain on the surface of the electrodes and may serve to counter acid attack from the electrolyte, rather than being etched into the electrode surface as occurs with the P, Al and B cations that stabilize the electrode surface structure.

The capacity delivered by Samples A-E as a function of current rate is shown in FIG. 5. These data also clearly demonstrate the superior electrochemical properties of the preconditioned electrodes (Samples B-E) that are able to withstand higher current discharge rates than the parent, untreated electrode (Sample A).

The charge and discharge voltage profiles of the $3^{rd}$ and $102^{nd}$ cycles of lithium-ion (full) cells containing electrode samples A, C, D, E and F between 4.5 and 3.0 V at 0.5 mA/cm² at room temperature are shown in FIG. 6(a-e), respectively; corresponding capacity vs. cycle number plots for the full 102 cycles are shown in FIG. 7. They demonstrate that significantly improved capacity is obtained from cells containing the preconditioned electrodes (Samples C-F) compared to the parent, untreated electrode (Sample A); moreover, the lithium-ion cells containing the preconditioned electrodes of the invention cycle with excellent capacity retention/stability.

Electrolyte Additives

In a further embodiment of the invention, it was discovered that instead of chemically preconditioning the electrodes with acid prior to cell assembly, the electrodes can be chemically conditioned, in situ, in an electrochemical lithium cell by salts containing one or more cations of ammonium, phosphorus, titanium, silicon, zirconium, aluminum and boron cations and stabilizing fluoride anions, for example, $NH_4PF_6$, $(NH_4)_2TiF_6$, $(NH_4)_2SiF_6$, $(NH_4)_2ZrF_6$, $(NH_4)_3AlF_6$ and $NH_4BF_4$. Two lithium-ion cells were assembled containing an MCMB 1028 graphite anode, a $0.1Li_2MnO_3 \cdot 0.9LiCo_{0.372}Ni_{0.372}Mn_{0.256}O_2$ cathode and an electrolyte comprising 1.2 M $LiPF_6$ in ethylene carbonate (EC): ethylmethyl carbonate (EMC). One of the cells contained 2 wt % $NH_4BF_4$ as an additive to chemically precondition the cathode surface in situ in the electrochemical cell. The two cells were subjected to 3 formation cycles during which the cells were charged and discharged between 4.1 and 3.0 V at ~0.2 mA (~C/10 rate). The cells were subsequently cycled and aged at an accelerated rate between 3.9 and 3.6 V at 55° C. at 2 mA (~C/1 rate) for 2 weeks. The impedance of each cell was measured before and after the aging process at 3.72 V at room temperature. It was observed that the impedance growth of the cathode in the cell containing the $NH_4BF_4$ electrolyte additive was significantly suppressed during the aging process, thereby providing evidence that the cathode surface had been passivated, confirming the beneficial effects of preconditioning the electrodes of this invention with mild acid, as described hereinbefore.

The examples and results described in this application clearly demonstrate the principles and advantages of this invention. It has been shown, in particular, that superior electrochemical properties, for example, enhanced capacity and cycling stability, can be obtained from $0.1 Li_2MnO_3 \cdot 0.9LiCo_{0.372}Ni_{0.372}Mn_{0.256}O_2$ electrodes that are preconditioned in aqueous or non-aqueous solutions containing both stabilizing cations and anions, such as phosphorus, aluminum and boron cations and fluoride anions as well as ammonium ions, particularly when cells are cycled between 4.6 and 3.0 V. The superior electrochemical properties are attributed particularly to etched electrode surfaces that contain both stabilizing cations and anions, the stabilized surface layer being robust to the diffusion of lithium ions from the electrode/electrolyte interface into the bulk of the electrode structure and vice-versa To those skilled in the art, it is easy to recognize that the principles of this invention in forming protective surfaces can be extended to other high potential metal-oxide- and lithium-metal-oxide electrodes, such as the family of lithium-manganese-oxide spinels and $V_2O_5$-based or $MnO_2$-based electrode materials, as described herein. This invention therefore relates to preconditioned metal-oxide and lithium-metal-oxide electrodes for both primary and secondary (rechargeable) lithium cells, a typical cell being shown schematically in FIG. 8, represented by the numeral 10 having a negative electrode 12 separated from a positive electrode 16 by an electrolyte 14, all contained in an insulating housing 18 with suitable terminals (not shown) being provided in electronic contact with the negative electrode 12 and the positive electrode 16. Binders and other materials normally associated with both the electrolyte and the negative and positive electrodes are well known in the art and are not fully described herein, but are included as is understood by those of ordinary skill in this art. FIG. 9 shows a schematic illustration of one example of a battery in which two strings of electrochemical lithium cells, described above, are arranged in parallel, each string comprising three cells arranged in series. The invention also includes methods of making the preconditioned electrodes, cells and batteries including the same.

While there has been disclosed what is considered to be the preferred embodiments of the present invention, it is understood that various changes in the details may be made without departing from the spirit, or sacrificing any of the advantages of the present invention. It is also understood that additional improvements in the capacity and stability of the electrodes can be expected to be made in the future by improving and optimizing the processing techniques whereby metal-oxide- and lithium-metal-oxide electrode materials are chemically etched in an aqueous or a non-aqueous solution containing stabilizing cations and anions to form a protective layer prior to their incorporation as electrodes in electrochemical lithium cells.

The embodiments of the invention in which an exclusive property or privilege is claimed are defined as follows:

1. A method of stabilizing a metal oxide or lithium-metal-oxide electrode material comprising contacting a surface of the electrode material, prior to cell assembly, with an aqueous or a non-aqueous acid solution having a pH greater than 4 but less than 7 and containing a stabilizing salt, to etch the surface of the electrode material and introduce stabilizing anions and cations from the salt into said surface, while the structure of the bulk of the electrode material remains unchanged; wherein the stabilizing salt comprises fluoride and at least one cationic material selected from the group consisting of ammonium, phosphorus, titanium, silicon, zirconium, aluminum, and boron.

2. The method of claim 1, wherein said stabilizing salt comprises one or more of phosphorus, aluminum, and boron.

3. The method of claim 1, wherein said electrode material has the general formula of $xLi_2M'O_3 \cdot (1-x)LiMO_2$ in which M' is one or more metal ions with an average tetravalent oxidation state and $0 \leq x < 1$, and in which M is one or more metal ions with an average trivalent oxidation state.

4. The method of claim 3, wherein M' is selected from Mn, Ti, and Zr and M is selected from Mg, Al, Ti, V, Cr, Mn, Fe, Co, and Ni.

5. The method of claim 4, wherein M' is Mn, and M is selected from Mn, Co and Ni.

6. The method of claim 1, wherein said electrode material has the general formula of $xLi_2M'O_3 \cdot (1-x)LiM_2O_4$ ($0 \leq x < 1$) and M' is one or more metal ions with an average tetravalent oxidation state and M is one or more metal cations with an average oxidation state of 3.5.

7. The method of claim 1, wherein said electrode material comprises a material selected from the group consisting of a $V_2O_5$-containing compound and a $MnO_2$-containing compound.

8. The method of claim 1, wherein the pH of the aqueous or non-aqueous acid solution is greater than 6 but less than 7.

9. The method of claim 1, wherein the stabilizing salt is selected from one or more of $NH_4PF_6$, $(NH_4)_2TiF_6$, $(NH_4)_2SiF_6$, $(NH_4)_2ZrF_6$, $(NH_4)_3AlF_6$, and $NH_4BF_4$.

10. The method of claim 1, wherein the non-aqueous acid solution comprises an alcohol.

11. The method of claim 10, wherein the non-aqueous acid solution comprises methanol.

12. A method of stabilizing a metal-oxide or lithium-metal-oxide electrode material comprising preconditioning the electrode material in situ within a non-aqueous lithium cell comprising an electrolyte, by dissolving one or more salts selected from $NH_4PF_6$, $(NH_4)_2TiF_6$, $(NH_4)_2SiF_6$, $(NH_4)_2ZrF_6$, $(NH_4)_3AlF_6$, and $NH_4BF_4$ in the electrolyte prior to cell assembly and thereafter cycling the electrode material through a charge-discharge cycle; wherein said electrode material has the general formula of $xLi_2M'O_3 \cdot (1-x)LiM_2O_4$ ($0 \leq x < 1$) and M' is one or more metal ions with an average tetravalent oxidation state and M is one or more metal cations with an average oxidation state of 3.5.

* * * * *